United States Patent
Danyluk et al.

(12) 
(10) Patent No.: US 6,679,117 B2
(45) Date of Patent: Jan. 20, 2004

(54) IONIZATION CONTACT POTENTIAL DIFFERENCE GYROSCOPE

(75) Inventors: Steven Danyluk, Atlanta, GA (US); Anatoly Zharin, Minsk (BY); Parbury P Schmidt, Jr., Falls Church, VA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/778,491

(22) Filed: Feb. 7, 2001

(65) Prior Publication Data

US 2002/0104376 A1 Aug. 8, 2002

(51) Int. Cl.$^7$ ............................. G01P 9/00; G01P 15/02
(52) U.S. Cl. ................. 73/514.25; 73/504.05; 73/514.09
(58) Field of Search .................... 73/514.09, 514.03, 73/504.05, 504.07, 504.06, 504.01, 514.19, 514.25

(56) References Cited

U.S. PATENT DOCUMENTS

| | | | | |
|---|---|---|---|---|
| 3,084,557 A | * | 4/1963 | von Ahlefeldt | 73/514.09 |
| 3,309,930 A | * | 3/1967 | Jones | 73/514.09 |
| 3,965,753 A | | 6/1976 | Browning, Jr. | |
| 5,087,533 A | * | 2/1992 | Brown | 429/5 |
| 6,238,812 B1 | * | 5/2001 | Brown et al. | 429/5 |

* cited by examiner

*Primary Examiner*—John E. Chapman
(74) *Attorney, Agent, or Firm*—Foley & Lardner

(57) ABSTRACT

An ionization contact potential difference gyroscope including a housing enclosing a first and second electrode with a gas, further including an ionization source capable of providing ions from the gas, and a contact potential difference measurement circuit that is capable of measuring an electrical signal related to the amount of ions striking at least one of the two surfaces. The measurement circuit of the present invention is capable of sensing the small amount of electrical current flowing as the electrons and ions strike one or both of the surfaces.

13 Claims, 2 Drawing Sheets

IONIZATION CONTACT POTENTIAL DIFFERENCE GYROSCOPE

This invention was made with Government support under Contract Number N00014-95-1-0903 awarded by the Office of Naval Research, United States Navy. The Government has certain rights in this invention.

BACKGROUND OF THE INVENTION

1. Field of the Invention

The present invention relates generally to rotational sensors and particularly to a gyroscope incorporating an ionization contact potential difference detector.

2. Description of Related Art

It has long been desired to eliminate sources of error from gyroscopes. Friction is a main contributing factor in the production of such errors. First order effects such as excessive drift, and bearing friction and gimble bearing friction produced precession are common with gyroscopes incorporating mechanical methods of restraint and support for the proof masses and gyroroters. Second order effects such as tumbling, gimble lock and coning errors are similarly undesirable.

Ring laser gyroscopes overcome many of the shortcomings of mechanical gyroscopes. A ring laser gyroscope is an instrument which employs the Sagnac effect to measure rotation rate. A ring laser gyroscope is a device comprising an arrangement of mirrors for directing light beams around a closed path through a gain region comprising a lasing gas and an arrangement of electrodes for creating an electrical discharge in the gas and a means for measuring the frequency difference of light beams thereby generated that are propagated around the closed path in opposite directions. The frequency difference of the light beams is a measure of the rotational rate of the ring laser gyroscope in the plane of the light beams. Yet, the expense of the ring laser gyroscope is one of its major drawbacks.

Another attempt to limit conventional gyroscopic errors is taught in U.S. Pat. No. 3,965,753 to Browning, Jr. This patent is directed to a sensing device, including an electrode assembly formed by three pairs of electrodes that creates a three axis electrical field surrounding a charged particle confined in a sealed space consisting either of a vacuum or one filled with a selected gas. The field is energizable to support the particle centerably in a state of stable equilibrium. A detector mounted exteriorly with respect to the electrode assembly is responsive to displacement of the particle from the central position. Such a displacement can be, for example, acceleration due to gravity or other motion, and a restoring force in operable association with the detectors. The electrical field is triggered by the displacement to return the particle to the central position. Yet, the Browning, Jr. sensing device is plagued with electro-magnetic instability, a high cost of manufacture and limited sensitivity.

In view of the above, there exits a need to provide a sensing device that limits the use of moving parts, or eliminates moving parts altogether. Further, there is a need for a sensing device that is more accurate than the conventional mechanical gyroscope, more economic than a ring laser gyroscope, and more stable and more sensitive than prior art designs. Another disadvantage in the gyroscopic art is the limited range of possible miniaturization of conventional gyroscopes. Thus, it would be further beneficial to provide a sensing device that is capable of a range of sizes, including use in nanotechnology applications.

U.S. patent application Ser. No. 09/553,780 (the "'780 Application") discloses a contact potential difference ionization probe that provides both a nondestructive testing method of condensed matter surfaces, and a sensing device for the measurement of the work function of the surface of a conducting or semiconducting sample. This '780 Application is fully incorporated herein by reference. The contact potential difference ionization detector has no moving parts, yet is sensitive enough so as to be capable of sensing gas currents due to the separation of ionized gases by the differences in chemical potential between two different metals. General principals of the ionization probe of the '780 Application are utilized to provide the superior gyroscopic device of the present application.

SUMMARY OF THE INVENTION

Briefly described, in a preferred form, the present invention is an extremely sensitive solid state gyroscope that is of such versatile construction that it can be utilized in a number of different applications, including the area of nanotechnology. The present solid state gyroscope is constructed in part on the principle of the ionization contact potential difference (Kelvin) probe. The gyroscope in the preferred embodiment comprises plates, a measurement circuit, an ionization source and a housing. The plates are two different metals inside the housing arranged so as to form the plates of a capacitor, and the plates are electrically connected by the measurement circuit. When the plates are electrically connected, the contact potential difference in the space between them creates an electric field between the plates. An ionization source is provided to ionize the gas located between the two plates. The electrical field created by the contact potential difference in the space between the plates separates the ions. As the ions strike the plates, an electrical current is generated in the measurement circuit.

The two plates of the gyroscope are enclosed in a sealed housing that is filled with a gas made up of heavy molecules that are polarizable. With the two plates stationary, the ionized gas strikes the plates and produces a current in the measurement circuit. If the plates are moved relative to the gas, the inertia of the molecules between the plates relative to the motion of the plates causes the electrical current to change, and the change in electrical current is related to the motion of the plates. The contact potential difference measurement circuit is capable of measuring the change in the current by a difference in the signal from the two plates. The measurement circuit of the present invention is capable of sensing the small amount of electrical current caused by motion of the ions moving between the plates. Due to a difference in the ionization of the atoms in the gap between the plates of the two probes and due to the difference in the adsorption layers on the plates of the two probes.

The housing can be filled with one or more gases. Mixtures of more than one gas is believed to provide a better signal than a pure substance, although a pure substance can also be used. Molecules with large dipole moments and heavy centers of inertia are believed to provide a more accurate gyroscope. With a mixture of gases, it is likely possible to take advantage of molecular collisions and interactions to gain a stronger polarizing effect.

The gyroscope can include a pair of plates for each degree of freedom that is to be monitored. Thus, a gyroscope comprising three sets of plates in addition to a ground plate, each at 90 degrees to each other, would be capable of monitoring three dimensional motion. The present gyroscope advantageously also has no moving parts and can easily be miniaturized.

Thus, an object of the invention is to provide an improved gyroscope. Another object of the present invention is to provide an improved gyroscope that is extremely sensitive to relative motion. These and other objects, features, and advantages of the present invention will be more apparent upon reading the following specification in conjunction with the accompanying drawings.

DETAILED DESCRIPTION OF PREFERRED EMBODIMENTS

Figure 1:
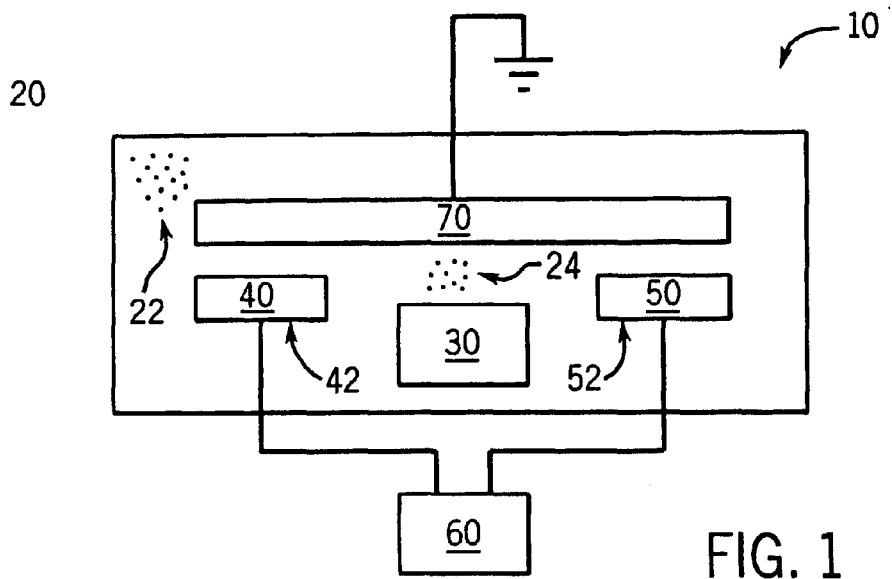
FIG. 1 is a diagram of an ionization contact potential difference gyroscope according to a preferred embodiment of the present invention.

Referring now in detail to the figures, wherein like reference numerals represent like parts throughout the several views, FIG. 1 shows an ionization contact potential difference gyroscope 10 comprising a housing 20, ionization source 30, a first and second surface 40 and 50, and a potential difference measurement circuit 60 (hereinafter, the "measurement circuit 60") that is capable of at least measuring an electrical signal related to the amount of ions striking at least one of the two surfaces and a grounding plate 70.

Gas molecules, shown representatively as molecules 22, the ionization source 30 and the first and second surfaces 40 and 50 are preferably hermetically sealed within the housing 20. A portion of the gas molecules 22 in proximity to the first and second surfaces 40 and 50 are formed into ionized particles 24 by the ionization source 30.

In a preferred embodiment, the ionization source 30 includes Americium-241 as the material providing the ionizing radiation. In other embodiments, the material can be similar radioactive elements. In a most preferred embodiment, the amount of Americium-241 is approximately 1/5000th of a gram. The radioactive element Americium has a half-life of 432 years, and is a readily available, commercial material source of alpha particles (the ionizing radiation) for the gyroscope 10.

The first and second surfaces 40 and 50 are parts of electrodes 42 and 52, respectively. For example, the first surface 40 of the gyroscope 10 can be a part of a positively charged form of the electrode 42. A negatively charged form of the electrode 52 then includes the second surface 50 which is thus a negatively charged surface. However, these charges can be reversed depending on what materials are being used in the gyroscope 10. In a preferred embodiment, the electrodes 42 and 52 (including the first and second surfaces 40 and 50, respectively) are flat as illustrated in FIG. 1, and the electrodes 42 and 52 are, respectively, two different conductive materials. Preferably, these metals will have widely varying Fermi energies, being, for example, copper and rubidium or other combinations with large variations.

The measurement circuit 60 of the gyroscope 10 electrically connects the first and second surfaces 40 and 50 and, thus, electrons flow from one metal to the other so that the Fermi energies are equal. The charges on the first and second surfaces 40 and 50 occur as the current tries to equilibrate the Fermi energies, and as a result, causes an electrical field to develop between them.

The voltage output measured by the measurement circuit 60 will be related to the number of the gas molecules 22 in the space/gap between the first and second surfaces 40 and 50, the rate of ionization of these gas molecules 22, the polarizability of the gas molecules 22, and the rate at which the gas molecules 22 strike the first and second surfaces 40 and 50. As air or other gas molecules move into or out of the space between first and second surfaces 40 and 50, the voltage will vary if all other parameters are kept constant. If the first and second surfaces are hermetically sealed along with the gas molecules 22, and if motion is imparted to the housing 20, the inertia of the ions in the space between the first and second surfaces 40 and 50 will necessarily affect the rate at which the ions strike the first and second surfaces 40 and 50. The gyroscope 10 sensitivity is related to the motion of the gas molecules 22, the polarizability of the gas molecules 22, and the number of the gas molecules 22 in the space between the plates.

If the housing 20 were to encapsulate the elements of the present gyroscope 10 surrounded by, for example, heavy gas molecules that are polarizable, the gyroscope 10 could discriminate between the gas molecules and be even more sensitive to motion. Alternatively, the positively charged electrode 42 (including the first surface 40) can vary between numerous sizes and shapes that can be chosen by the user of the gyroscope 10. An electric field, which can then attract and repel the appropriately charged ionized particles, can be generated by the positively charged electrode 42 (including the second surface 40) and the negatively charged electrode 52 (including the surface 50). It will be apparent to those of skill in the art that the negatively charged electrode 52 and first and second surfaces 40 and 50 can also vary as to shape, size and orientation.

The alpha particles generated by, for example, the ionization source 30 ionizes the gas molecules 22 in the housing 20. Such ionization provides a free electron (with a negative charge) and an atom missing one electron (with a positive charge), namely an ion. The negatively charged electron is attracted to the positively charged electrode 42 (including the first surface 40), while the positively charged atoms are attracted to the negatively charged second surface 50.

Figure 2:
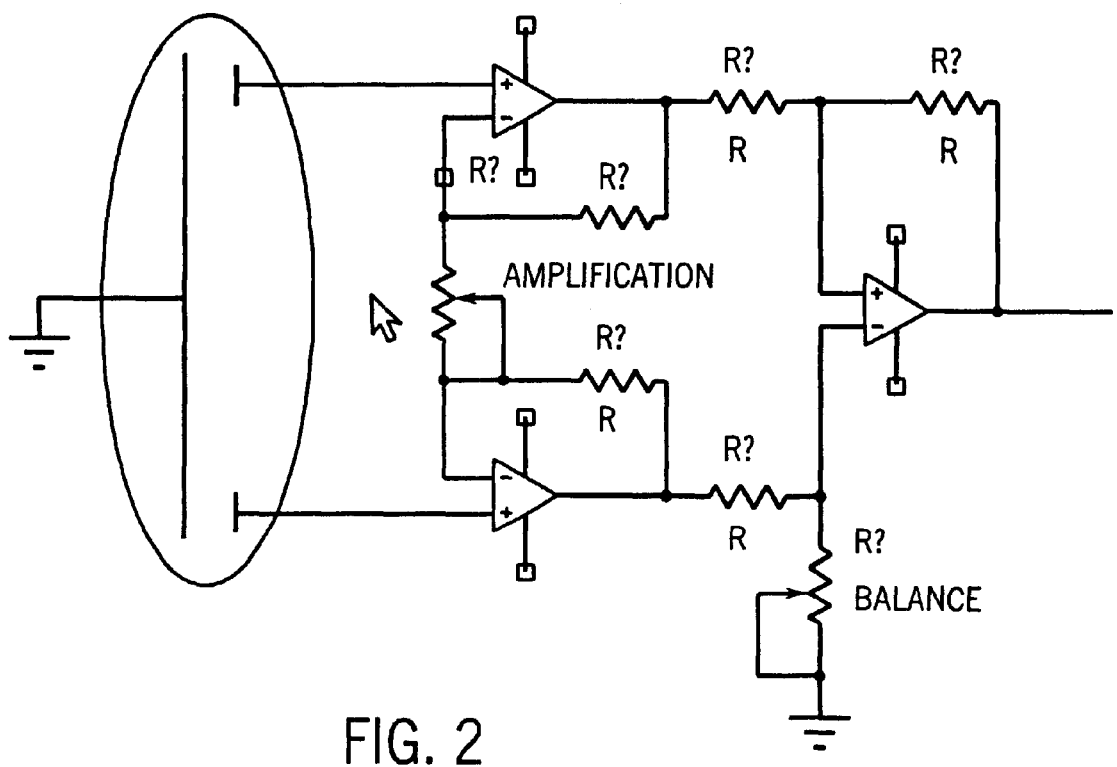
FIG. 2 illustrates a preferred measurement circuitry of the present invention.

In a preferred embodiment of the circuit 60 shown in FIG. 2, the measurement circuit 60 of the present gyroscope 10 is capable of sensing the differential of the small amount of electrical current embodied in the motion of these electrons and ions moving toward the first and second surfaces 40 and 50. One important feature of the present gyroscope 10 is the sensing of signals related to the contact potential difference of the first and second surfaces 40 and 50, wherein the signal is related to an ionized gas present in the gap between the first and second surfaces 40 and 50. An extremely sensitive method of contact potential ionization detection according to the present invention comprises the steps of generating an electric field between the first and second surfaces 40 and 50 and measuring the current using the measurement circuit 60, wherein the electric field is characteristic of the contact potential difference. If the gas that is present between the first and second surfaces 40 and 50 is ionized, then the contact potential difference, or electric field, attracts the ionized gas molecules 22. When the gas molecules 22 strike the surface of the appropriate positively charged and negatively charged electrodes 42 and 52 (including the respective first and second surfaces 40 and 50), a current in the measurement circuit 60 is recorded. The current is then related to the ionization source and the value of the contact potential difference, or the electrical field between the first and second surfaces 40 and 50.

Figure 3:
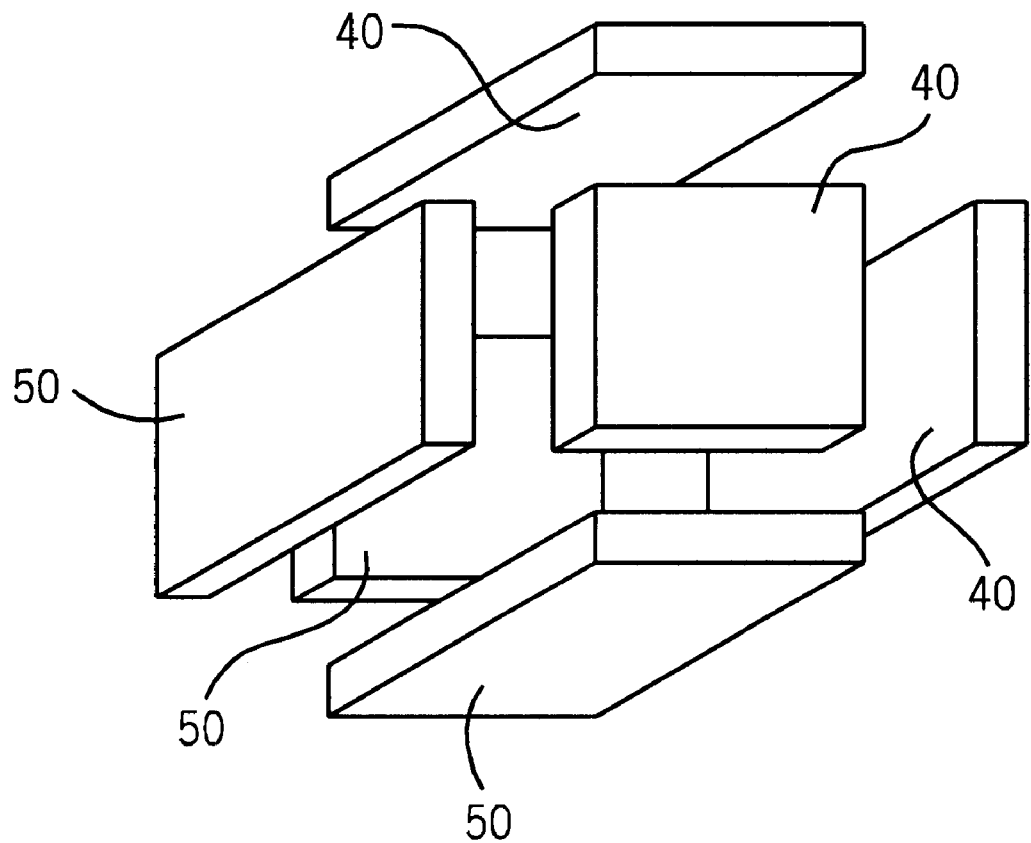
FIG. 3 shows a gyroscope of the present invention capable of monitoring the motion of the ions in three dimensions.

The gyroscope 10 of the present invention is capable of monitoring the motion of the ions in three dimensions is shown in FIG. 3. The gyroscope 10 is shown having three sets of the first and second surfaces 40 and 50 arranged is a cubic geometry.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A gyroscopic device comprising first and second surfaces being in electrical communication, said first and second surfaces having different work functions and being separated from one another by a space, and a potential difference measurement circuit for measuring a differential current related to a contact potential difference between said first and second surfaces, wherein ionized gas is in the space between said first and second surfaces, and the device and the accompanying gas are moved by the means for imparting motion and wherein the differential current arises from relative motion of the gas between the first and second surfaces created at least in part by motion of the device.

2. The gyroscopic device of claim 1, said first surface being a first conductive material.

3. The gyroscopic device of claim 1, said first surface fixedly separated from said second surface.

4. The gyroscopic device of claim 1 comprising three sets of said first and second surfaces, each said set of first and second surfaces forming a pair of first and second surfaces both positioned in parallel planes, each said pair of first and second surfaces being in a perpendicular plane relative to each other said pair of first and second surfaces.

5. The gyroscopic device of claim 1 further comprising an ionization source for forming the ionized gas in the space between said first and second surfaces.

6. The gyroscopic device of claim 5, said first surface being a first conductive material, said second surface being a second conductive material and said ionization source being a radioisotope.

7. The gyroscope device of claim 1 further comprising a housing enclosing said first and second surfaces and the ionized gas.

8. The gyroscopic device of claim 7, said housing hermitically sealing said first and second surfaces and the ionized gas.

9. A gyroscope device comprising a hermetic housing enclosing a gas and a pair of electrodes being electrically connected and separated by a space, a contact potential difference being established between the electrodes and the contact potential difference creating an electric field in proximity to said electrodes, a radioisotope for ionizing a portion of the gas, and the potential difference measurement circuit for measuring a differential current related to the electric field and the differential current arising from relative motion between the ionized gas and the pair of electrodes.

10. The gyroscope of claim 9, the gas made up of heavy molecules that are polarizable.

11. A method of sensing motion of a mobile object comprising the steps of providing the mobile object with two surfaces, each of the surfaces being of different work function separated by a space, providing ions in the space, thereby establishing a contact potential difference between the two surfaces with a differential current being capable of flowing between the two surfaces across the space, the differential current being related to the motion of the ions relative to the two surfaces of the mobile object, measuring the differential current, and determining the motion of the mobile object from variations in the differential current.

12. The method of sensing motion according to claim 11, said two surfaces and the ions being hermetically sealed within a housing.

13. A method of sensing motion of a mobile object comprising the steps of providing a device having at least three surfaces with each surface having a work function and the surfaces having at least two different work functions, thereby forming a contact potential difference across a space, providing ions disposed in the space, measuring a differential current related to changes in the relative motion of the ions contacting the surfaces and determining the motion of the mobile object from variations in the differential current.

* * * * *